US007788406B2

(12) United States Patent
Basso et al.

(10) Patent No.: US 7,788,406 B2
(45) Date of Patent: *Aug. 31, 2010

(54) METHOD AND SYSTEM FOR REDUCING LOOK-UP TIME IN PACKET FORWARDING ON COMPUTER NETWORKS

(75) Inventors: Claude Basso, Raleigh, NC (US); Bay Van Nguyen, Cary, NC (US); Max Robert Povse, Apex, NC (US); Natarajan Vaidhyanathan, Greensboro, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/780,444

(22) Filed: Jul. 19, 2007

(65) Prior Publication Data

US 2009/0103536 A1 Apr. 23, 2009

Related U.S. Application Data

(63) Continuation of application No. 10/230,921, filed on Aug. 29, 2002, now Pat. No. 7,310,685.

(51) Int. Cl.
*H04L 12/28* (2006.01)

(52) U.S. Cl. .................. 709/242; 709/238; 370/351

(58) Field of Classification Search .................. 709/242, 709/238, 230; 370/351
See application file for complete search history.

(56) References Cited

U.S. PATENT DOCUMENTS

| 5,251,205 | A | 10/1993 | Callon et al. |
| 5,490,252 | A | 2/1996 | Macera et al. |
| 5,917,820 | A | 6/1999 | Rekhter |
| 6,119,171 | A | 9/2000 | Alkhatib |
| 6,292,832 | B1 | 9/2001 | Shah et al. |
| 6,339,595 | B1 | 1/2002 | Rekhter et al. |
| 6,643,706 | B1 | 11/2003 | Marques et al. |
| 6,963,575 | B1 | 11/2005 | Sistanizadeh et al. |
| 7,260,096 | B2 * | 8/2007 | Basso et al. .................. 370/392 |
| 7,310,685 | B2 * | 12/2007 | Basso et al. .................. 709/242 |
| 2003/0101276 | A1 | 5/2003 | Park et al. |

* cited by examiner

*Primary Examiner*—Kenneth R Coulter
(74) *Attorney, Agent, or Firm*—Yee & Associates, P.C.; Mark E. McBurney

(57) ABSTRACT

Lookup time in packet forwarding on computer networks is reduced. A first lookup is performed in a memory tree to find a first protocol forwarding entry in the memory tree. The forwarding entry includes first protocol (e.g., EGP) information and cached associated second protocol (e.g., IGP) information. Both EGP and IGP information are retrievable with the first lookup and used in the determination of an EGP route for the data packet. If the cached IGP information has been invalidated due to address updates, a second lookup can be performed to find an original IGP entry in the memory tree, the information from which can be cached in the EGP forwarding entry if a background maintenance task has finished designating all the EGP entries as having out-of-date caches.

14 Claims, 5 Drawing Sheets

METHOD AND SYSTEM FOR REDUCING LOOK-UP TIME IN PACKET FORWARDING ON COMPUTER NETWORKS

CROSS-REFERENCE TO RELATED APPLICATIONS

Under 35 USC §120, this application is a continuation application and claims the benefit of priority to U.S. patent application Ser. No. 10/230,921 filed Aug. 29, 2002 entitled Method and System for Reducing Look-up Time in Packet Forwarding on Computer Networks, now U.S. Pat. No. 7,310,685 issued Dec. 18, 2007, all of which is incorporated herein by reference.

FIELD OF THE INVENTION

The present invention relates to forwarding of data packets on computer networks, and more specifically to the lookup of routing information for the forwarding of packets on computer networks.

BACKGROUND OF THE INVENTION

Computer networks have steadily increased in importance as more individual users, businesses, and other organizations send information to each other's computers by electronic distribution systems. Both local networks, such as Local Area Networks (LANs) within an organization, and wide area networks (WANs), such as the Internet, have widespread use. With many different local networks communicating with each other over wide area networks, data must be routed through different connections using a variety of networking protocols. One widely-used protocol for use with the Internet is the Border Gateway Protocol (BGP). This is an exterior gateway protocol (EGP), i.e., an interautonomous system routing protocol, meaning that it is used to carry routing information externally between different Autonomous Systems (AS's). An AS is, for example, a particular computer network or group of networks under a common administration and with common routing policies that can communicate with another AS via a WAN such as the Internet.

In implementing the BGP, an AS can include one or more routers to receive data from and send data to other AS's. For BGP routes, the router looks up routing information based on received data packets. Using an Interior Gateway Protocol (IGP), the router then forwards the data to a proper destination address (port) based on the routing information, whether that port be within the AS of the router (e.g. on an internal network), or eventually out to another router of another AS.

A router finds the outgoing interface of each incoming packet by querying a routing table stored in that router. For example, a router uses the destination address of every incoming packet to decide the proper next-hop information of the packet from the table, i.e. the information describing the address of the next router in the route to the destination of that packet.

The lookup of routing information takes time, and it can be difficult in many implementations to achieve transfers at full wire speeds, i.e. at the maximum speed of data transfer allowed by the communication channel. Resolving BGP routes are time consuming for a variety of reasons. For example, a Longest Prefix Match (LPM) search is often performed to find more efficient routes. This type of search finds the longest prefix match (matched address) of the destination address from all of the prefixes stored in the router, and can be used to find an appropriate forwarding port for routers and layer 3 switches. This kind of search may require two accesses of "leaves" of a "tree" in memory: one access being a read operation to obtain the pattern contained in the forwarding leaf for a "compare-at-end" operation, and the second access being a second read operation to backtrack to the longest match if the compare-at-end operation fails. Thus, this operation may require two accesses to leaf memory.

Another reason for potential time delay in relaying data for BGP routes is the organization of routing addresses. For BGP routes, a first lookup in the memory tree returns a next-hop value that is used as the key for a second tree search operation. The second lookup in the tree returns the needed IGP routing information. This two-level lookup allows for a smaller number of entries in the routing table to be updated when there are topology changes in the AS, since external routes do not have to be updated when internal routes change within an AS. However, having to do this second lookup requires another potential two memory accesses to leaf memory, slowing down transmission times.

In any given router design, there is a cycle budget that can be calculated based on the repeated arrival of packets having a minimum length. To maintain wire speed routing, the processor in the router must complete all of its operations under this cycle budget. Accessing memory as many as four times for a BGP route severely limits the speed of the data transmission.

Accordingly, what is needed is a system and method for reducing the access of memory when resolving BGP or other external gateway protocol routes. The present invention addresses such a need.

SUMMARY OF THE INVENTION

The present invention relates to reducing the time in looking up destination addresses when routing data packets on computer networks. For exterior gateway protocols, the invention allows less lookups of destination addresses for the data packets so that the packets are sent faster through routers to their proper destinations on the network.

More specifically, the present invention provides a method for reducing the time to determine data packet routes on a computer network, and includes performing a single lookup in a memory tree to find a particular first protocol forwarding entry in the memory tree to determine a first protocol route (e.g., an exterior gateway protocol (EGP) route) for a packet of data to be routed on the computer network. The forwarding entry includes first protocol information and a cache of associated second protocol information (e.g., Interior Gateway Protocol (IGP) information). Both the first protocol information and the cached second protocol information are retrievable with the single lookup. The cached second protocol information is used in the determination of a destination for the packet of data on the computer network. In another aspect, a computer readable medium includes program instructions that perform similar steps on a computer device for reducing the time to determine data packet routes on a computer network.

In another method of the present invention for reducing the time of determination of data packet routes on a computer network, a first lookup in a memory tree is performed to find a first protocol forwarding entry in the memory tree to determine a first protocol route for a packet of data on the computer network. The forwarding entry includes first protocol information and a cache of associated second protocol information, both types of information retrievable with the first lookup. It is determined whether the cache is valid or has been invalidated due to an update to at least one second protocol entry in the search tree. If the cache is valid, the cached second protocol information is used to determine a destination for the packet of data on the computer network. If the cache has been invalidated, a second lookup in the memory tree is performed using the first protocol information to find an original second protocol entry in the memory tree, where information in the original second protocol entry is used to determine the destination for the packet of data. In another aspect of the present invention, a computer readable medium includes program instructions that perform similar steps on a computer device for reducing the time to determine data packet routes on a computer network.

In yet another aspect of the present invention, a method for allowing the reduction of time for lookup and resolution of data packet routes on a computer network includes, for a plurality of second protocol (e.g., IGP) entries stored in a memory of an electronic apparatus, storing IGP information from each IGP entry into a cache in an associated first protocol (e.g., EGP) entry in the memory to allow the information from both entries to be read with a single lookup to the memory. The information from both entries is used to resolve a EGP route for a packet of data on the computer network. The cache in all EGP entries is invalidated when a change to at least one of the IGP entries is made. After the change to at least one of the IGP entries is made, the storing of information from IGP entries into the caches in associated EGP entries is repeated. In another aspect of the present invention, a computer readable medium includes program instructions that perform similar steps on a computer device for reducing the time to determine data packet routes on a computer network.

In another aspect of the present invention, a method for reducing the time to determine data packet routes on a computer network includes providing a forwarding process for looking up routing information from a memory to route a data packet on the computer network. Original second protocol entries are stored in the memory and each include second protocol information, and first protocol combined entries are stored in the memory and each include a first protocol entry and cached second protocol information retrieved from an associated original second protocol entry. The forwarding process includes a lookup in the memory to find a particular first protocol combined entry in the memory, where the lookup obtains the first protocol entry and the cached second protocol information to provide a route for the data packet. A background maintenance process is also provided for maintaining the coherency of the cached associated second protocol information so that the cached second protocol information does not become stale when the original second protocol entries get updated. In another aspect of the present invention, a computer readable medium includes program instructions that perform similar steps on a computer device for reducing the time to determine data packet routes on a computer network.

The present invention provides the ability to perform very fast packet forwarding during the address lookup stage of network routing. For example, layer 3 packet forwarding can be performed at wire speeds for the cases in which the initial lookup address is a BGP address. The present invention minimizes the processing time for two lookups by storing the desired routing information of the second lookup in the same location as the first lookup information, in effect collapsing the two lookups into one lookup and therefore greatly reducing lookup time. These and other advantages of the present invention will become apparent to those skilled in the art upon a read

DETAILED DESCRIPTION OF THE PREFERRED EMBODIMENTS

The present invention relates to reducing the time in looking up destination addresses when routing data packets on computer networks. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
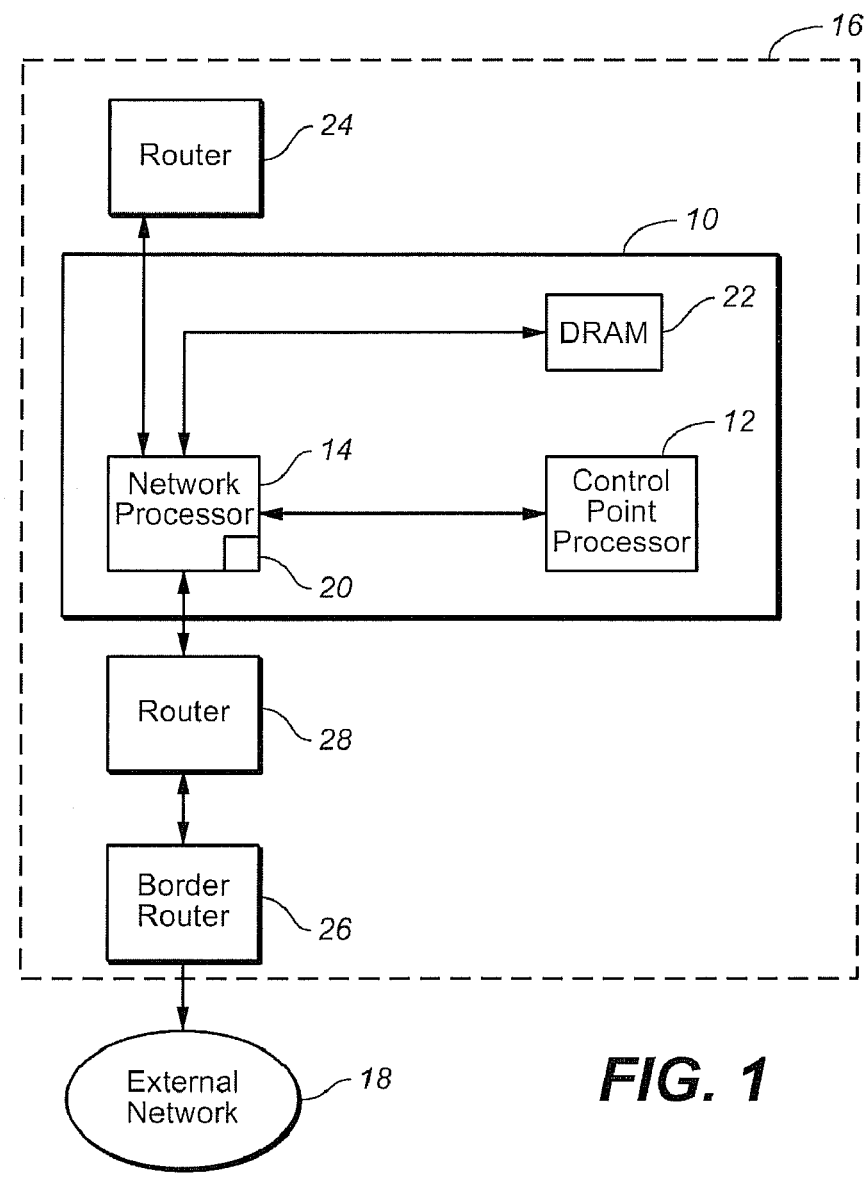
FIG. 1 is a block diagram illustrating a router and computer network suitable for use with the present invention.

FIG. 1 is a block diagram of a simplified, applicable portion of a router 10 for use with the present invention. Although a router 10 is shown for use with the examples herein, the present invention can be implemented on any electronic device have the appropriate processing capability and memory, such as a router, a specialized or general purpose computer device, or other apparatus. Furthermore, the roles and functions described below for processors and memory can be distributed in other ways in other embodiments.

Router 10 examines the destination address of an incoming data packet (or "frame"), determines the address of the next-hop router, and forwards the packet to the next-hop. The next-hop route is stored in a routing table, which is created and maintained by a routing protocol, including exterior gateway protocols (EGP's) such as border gateway protocol (BGP), and interior gateway protocols (IGP's), such as Open Shortest Path First (OSPF). When BGP is used between AS's, the protocol is referred to as External BGP (EBGP). BGP can also be used to exchange routes within an AS, and the protocol is then referred to as Interior BGP (IBGP). Herein, the use of the term "BGP" is intended for use between AS's (EBGP); but alternatively the invention can be used for implementations that use IBGP as an IGP.

Router 10 can include a control point processor 12 and a network processor 14. Control point processor 12 controls the operation of router 10 and handles the protocols running on the network. The control point processor receives different frames for protocols in data packets and gathers up all the route information, where application programs running on the control point processor 12 implement the BGP protocol and/or any other implemented protocols. The processor 12 may receive packets (via processor 14) from all the other routers that are connected to it, and figures out for each packet what the route is for that packet. These other routers may be situated within the same network (AS) 16 as router 10, or in another AS accessed by an external network 18.

The network processor 14 within router 10 is connected to the control point processor 12. Control point processor 12 establishes the routes to other routers and downloads lookup tables to the network processor. Control code 20 (also known as embedded code or microcode) running on the network processor 14 can be used to act upon the information downloaded by the control point processor. A co-processor (not shown) can also be connected to network processor 14 to perform tasks such as LPM searches, where the co-processor implements a Tree Search Engine; see below. Guided frames can be downloaded to the network processor 14 which include information that instructs the network processor in how to create the tables, which can take the form of memory trees; within the trees there is leaf information. Network processor 14 is connected to Dynamic Random Access Memory (DRAM) 22 and creates the tables (memory trees) which can be stored in DRAM 22. The leaf information ("leaves") within the memory table includes the information that determines how to route a packet to its destination; a leaf is a block of memory that is returned on a lookup.

When a lookup of the tree stored in DRAM 22 is to be performed for a BGP route, an internet protocol (IP) destination address is obtained by the network processor 14 from the incoming data packet for use as a search key into the tree. The entries in the lookup tree are maintained by the control point processor 12. The tree in memory is searched by a first lookup using that destination address to obtain a BGP route from a border router of the AS 16 to the destination address. That BGP route is then used to provide IGP information which allows the data packet to be forwarded to the proper router within the router's AS. The IGP information is provided to the network processor 14, which sends the data packet to the destination determined by the IGP information. The sets of routes stored in the tables in DRAM 22 are continually updated by the control point processor; for example, an IPv4 (Internet Protocol version 4) routing table is updated by IGP routing protocols such as Routing Information Protocol (RIP) or Open Shortest Path First (OSPF). The routes can change when the topology of the network changes, for example.

For example, router 10 may receive a data packet from router 24, which is another router within the same AS 16 as router 10. The data packet needs to be sent to an external address in the external network 18 (e.g., the Internet) using BGP. The router uses the external address to provide a BGP lookup into the routing tree in DRAM 22, and obtains a BGP route, which in this example is the address of the router 26, which is a border router that interfaces the AS 16 with the external network 18. Now, the router 10 needs to know how to get the packet to border router 26. The router 10 performs a second lookup in the routing tree to obtain an IGP route that tells the router 10 an efficient next hop in the AS 16 that is en-route to border router 26; in this example, the IGP route is the address of router 28. Router 10 then sends the data packet to router 28. In the present invention, however, the second lookup may not be required; this is described in detail below.

Reducing LookUp Time

The present invention is primarily concerned with reducing the amount of time it takes to achieve address lookups in a router, so that wire speeds of data transmission can be maintained. As explained above, more than one lookup in a table can cause significant delays so that wire speeds may not be able to be maintained. Routers typically maintain wire speeds for single look-up (IGP) operations; the goal to solving the problem of more than one lookup, therefore, is to constrain BGP or other external routing protocol look-ups to have no more memory accesses than single IGP lookups. It should be noted that the discussion of memory accesses here are typically referring to DRAM accesses (and other types of memory accesses having similar access times to DRAM accesses). The memory access times for DRAM are significantly greater than the memory access times of other types of memory, such as SRAM, for example.

Figure 2:
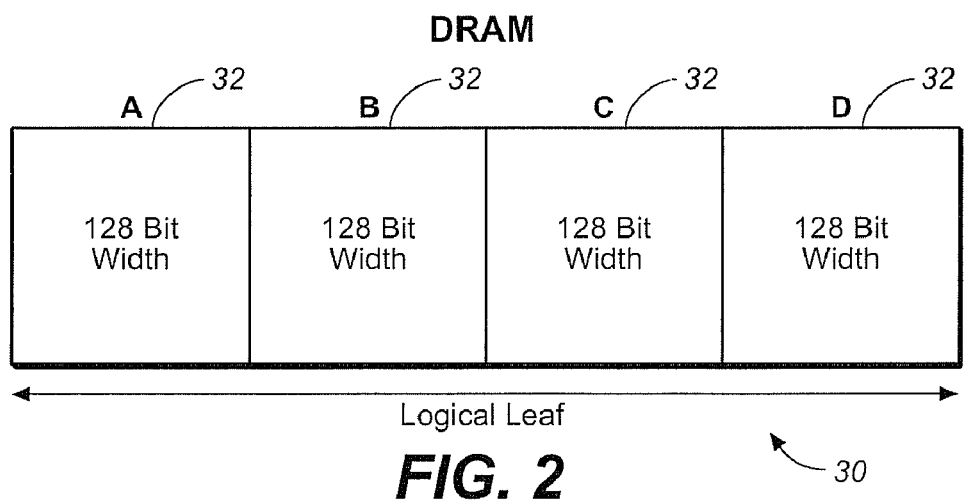
FIG. 2 is a diagrammatic illustration of the DRAM in the router of FIG. 1 which can be used to store routing information for use with the present invention.

FIG. 2 is an illustration of a generic structure of a forwarding leaf 30 in DRAM 22. Leaf 30 shows a partitioning of DRAM into multiple banks 32, where each bank 32 (labeled as "A," "B," "C," and "D") holds information in consecutive bits up to the width of memory. One goal of the present invention is to limit the accesses to any given DRAM bank to one.

In some embodiments, SRAM can be used in conjunction with DRAM to speed access to memory. Embodiments of such a design are described in greater detail in patent application Ser. No. 10/191,657, filed Jul. 9, 2002, now U.S. Pat. No. 7,260,096, issued Aug. 21, 2007, and entitled, "A Method and Router for Forwarding Internet Data Packets." However, most of the software-required information, i.e., the forwarding parameters that are used to manage the flow of the frame through the network processor 14, must be stored in DRAM 22. DRAM type memory, not SRAM, typically affords the kind of density and width needed to maintain large forwarding tables. Therefore, in the prior art two lookups may have to be made to DRAM even if SRAM is used to store other needed information in lookup operations. Ideally, the access to any given DRAM bank should be limited to one to avoid the delays in lookups.

The present invention proposes a solution to allow the lookups to a DRAM bank to be reduced to one. A method is described in which information is cached from the second forwarding entry (IGP route) into the first entry (BGP lookup). This method creates the opportunity for accessing the required routing information while still having all banks of DRAM 22 accessed only once. Additional benefits of the method include the reduction of the IPv4 code path (less instructions) for BGP routing, increasing the headroom in the forwarding path for other functions, and the reduction of the overall use of memory bandwidth.

To avoid two Tree Search Engine (TSE) look-ups (e.g., searches by a co-processor to the network processor 14), the information from the IGP entry can be stored in a cache in, or associated with, the BGP entry. Thus, a single look-up to the BGP entry will also allow the associated, cached IGP information to be accessed at the same time, giving the same functional behavior as doing two operations.

A problem with this solution is that a particular IGP entry may be cached into multiple BGP entries. When the IGP entry changes due to updates in addresses on the network, it is not practical to keep track of all the individual BGP entries in which that IGP entry is stored. A mechanism is therefore needed which can invalidate the cache of the BGP entries associated with the changing IGP entry. This invalidation should happen very quickly to ensure proper routing behavior.

A solution of the present invention to this problem is multifold. In one part, a global indicator is used, e.g. in the present example a Global Valid (GV) flag is created and stored in memory (for example, in one embodiment, the GV flag is stored in local register space of the network processor to allow quick access). By definition, the cached IGP information is valid in a BGP entry only if the GV flag is TRUE. Whenever an IGP change or update is made by the network processor, GV is set to FALSE. The simple action of setting GV to FALSE quickly invalidates the cache in all BGP entries in the memory tree.

Furthermore, in each individual forwarding entry in memory, a new local entry status indicator is introduced and stored, e.g. in the present example a "Local Valid" (LV) flag is stored. If the LV flag in that forwarding entry is FALSE, the cached information in that particular entry should not be used.

The combination of the values of the GV and LV flags govern the lookup and caching operations. Consider the following truth table, Table 1:

TABLE 1

| GV Value | LV Value | Operation |
|---|---|---|
| 1 | 1 | The BGP entry has valid cached IGP information. There is no need to perform two lookups. The value implies no need to perform caching. |
| 1 | 0 | The BGP entry has no valid cached IGP information. Perform an initial two-lookup operation to find IGP information. Cache the IGP information in the BGP entry and set LV = 1. |
| 0 | X | Some IGP information has changed or is about to change. The IGP information in all BGP entries should now be considered suspect. Revert to two-lookup operation mode to find IGP information and do not cache it. |

These operations are summarized in the flow diagrams of FIGS. 3-6, described in detail below.

Another problem is related to the fact that when IGP updates occur, the caches are invalidated, and therefore the standard behavior of doing two lookups, with no caching, is reverted to. However, IGP is expected to be stable and such updates do not typically happen often. Once IGP updates stop, the caching behavior can be resumed in order to allow the one-lookup operation of the present invention to resume. To enable this, the GV flag should be set back to TRUE, and the LV flags in all the leaves should be reset to FALSE— otherwise the "old" invalidated cached IGP information will be used. A condition underlying these operations is that tree updates are handled by a parallel control process or "control code" path, which is a slower process than the forwarding process that forwards packets. The forwarding processes do not know when the IGP updates have stopped.

The solution of the present invention to address these needs is to implement a periodic cache-maintenance task that can run in a background thread of the network processor. This background task maintains cache coherency so that the system will not forward a packet using stale cached information, and is referred to herein as the Back Ground Maintenance (BGM) task, described in greater detail below with respect to FIG. 6.

Figure 3:
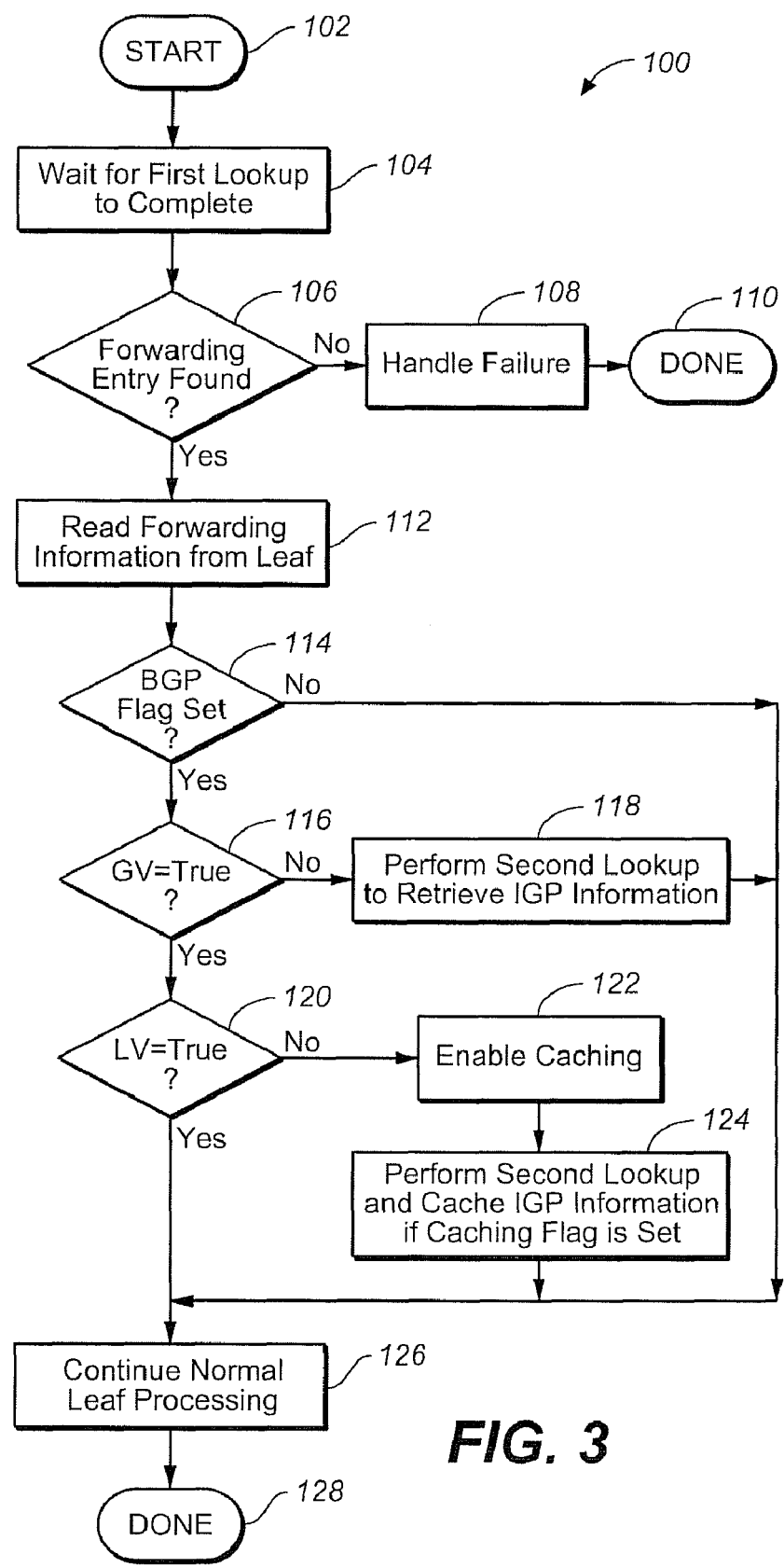
FIG. 3 is a flow diagram illustrating a portion of a forwarding process of the present invention that reduces the lookup time when accessing routing information in memory.

FIG. 3 is a flow diagram illustrating a method 100 of the present invention to implement the above-described solutions to providing a single lookup to DRAM. The flow diagrams illustrated herein are preferably implemented by control code (software instructions) on the network processor 14, where the software is implemented with program instructions stored on a computer readable medium (memory device, CDROM or DVDROM, magnetic disk, etc.). Alternatively these methods can be implemented in hardware, or a combination of hardware and software; and in other embodiments different processor(s) or circuit(s) can implement the method.

Method 100 is implemented by the forwarding process running on the network processor, i.e., this process is part of the forwarding process that performs the lookup operations to retrieve the destination address information for the received data packets that are to be routed. The method begins at 102, and in step 104, the process waits for the first lookup to be complete. This step is a marker for the insertion of the method of the present invention into the normal forwarding process flow. At this point a first lookup, e.g. an LPM search, has been previously initiated and all the possible processing that could be done without the results has completed. The forwarding process has reached a point in which it must wait for the first lookup to complete, which provides a forwarding entry from the memory tree. The LPM search can be performed, for example, by a Tree Search Engine, e.g., a co-processor to the network processor 14.

Once the first lookup is complete in step 104, in step 106 the process 100 checks whether the desired forwarding entry was found or not. If the search was successful, i.e., the lookup entry was in the forwarding tree, then the process continues to step 112. If the search failed to find the lookup entry, the process exits the mainline flow to handle the failure at step 108 as is well known in router design, and the process is complete at 110.

If a forwarding entry was found, then in step 112 the first lookup is performed, i.e., the found forwarding entry is read from the associated leaf in the memory tree stored in DRAM 22. This information includes control flags from the leaf that will dictate the look-up and caching behavior of the process of the present invention. The control flags include the BGP action flag and the LV (Local Valid) flag. For example, these flags can be found in the SRAM portion of a split-leaf structure or, in a more generic leaf, at the beginning of the DRAM leaf. An example of a split-leaf SRAM/DRAM implementation of a leaf structure/layout values is described below with reference to Tables 2-4.

In next step 114, a test is made of the BGP action flag. This flag indicates whether or not the found forwarding entry is a BGP entry, i.e., whether the route being searched is a BGP route that is to be processed according to the BGP protocol (if it is not a BGP entry, it is an IGP entry). If not a BGP entry, then the found entry is an IGP entry, and the process skips ahead past the BGP caching logic and continues normal leaf processing at step 126 to find the data packet route using the IGP information. This is one desired result of the present process: to achieve a "normal" or single lookup flow.

If the BGP flag of step 114 is TRUE, then in step 116, a test is made of the GV flag. Since it is known from step 114 that the route being currently searched is a BGP route, the GV flag test is used to determine if a BGP entry is valid, i.e. if the cached IGP information in this BGP entry can be used. As described above, this global flag is accessed from a known memory location and was architected to create a quick way to invalidate all BGP entries if any IGP entries are changed or updated. Therefore, if GV is FALSE, the process branches out of the mainline flow to step 118 to perform a second lookup, described in detail below with reference to FIG. 5. Since GV is FALSE, the method will not cache the IGP information that is found with the second lookup, thus performing the "normal" (less than optimal) procedure of a two look-up BGP code path. GV is FALSE if the cached IGP information has been invalidated due to any IGP entry being updated and the background maintenance task has not yet finished resetting the LV flags in each BGP entry (see FIG. 6). After step 118, the process continues to step 126 to continue normal leaf processing, where the IGP entry found in the second lookup of step 118 is used to determine the destination address of the data packet.

If the GV flag is TRUE at step 116, the process continues to step 120. In step 120, a test is made of the LV (local value/valid) flag for the found forwarding entry. It is known from the previous steps that the retrieved entry is a BGP entry and that caching has been enabled via the GV flag. The current step 120 tests the LV flag stored within (or associated with) the found leaf entry to determine if this BGP entry has up-to-date cached IGP information. If so, the code continues to step 126, which is the normal single look-up leaf processing path. The normal processing path takes the cached IGP information to determine the desired destination address for the current frame (data packet). This achieves the main goal of the present invention, since the multiple accesses to DRAM to get this IGP information have been reduced to a single look-up. If, however, LV is not TRUE in step 120, then this indicates that the current IGP information in the forwarding entry is out of date, but that it is permitted to cache IGP information in that entry. This occurs after all the LV flags in the BGP entries have been reset after an update, e.g. by the background maintenance task of FIG. 6. The main path is therefore temporarily exited and step 122 is initiated to enable caching; this step is described in greater detail below with respect to FIG. 4. After step 122, the process performs step 124, which is a second lookup similar to step 118, and which is described below with reference to FIG. 5. However, unlike in step 118, caching was enabled in step 122, and step 124 caches the IGP information (found in the second lookup) into the current forwarding entry if a caching flag is set, as described in FIG. 5.

After step 124, or if the LV flag is TRUE in step 120, the process continues to step 126, at which point the normal leaf processing commences, and uses the IGP information (found either in the cache or in the original IGP entry in the tree) to determine the destination address of the data packet. The process of the present invention is complete as indicated at 128.

Figure 4:
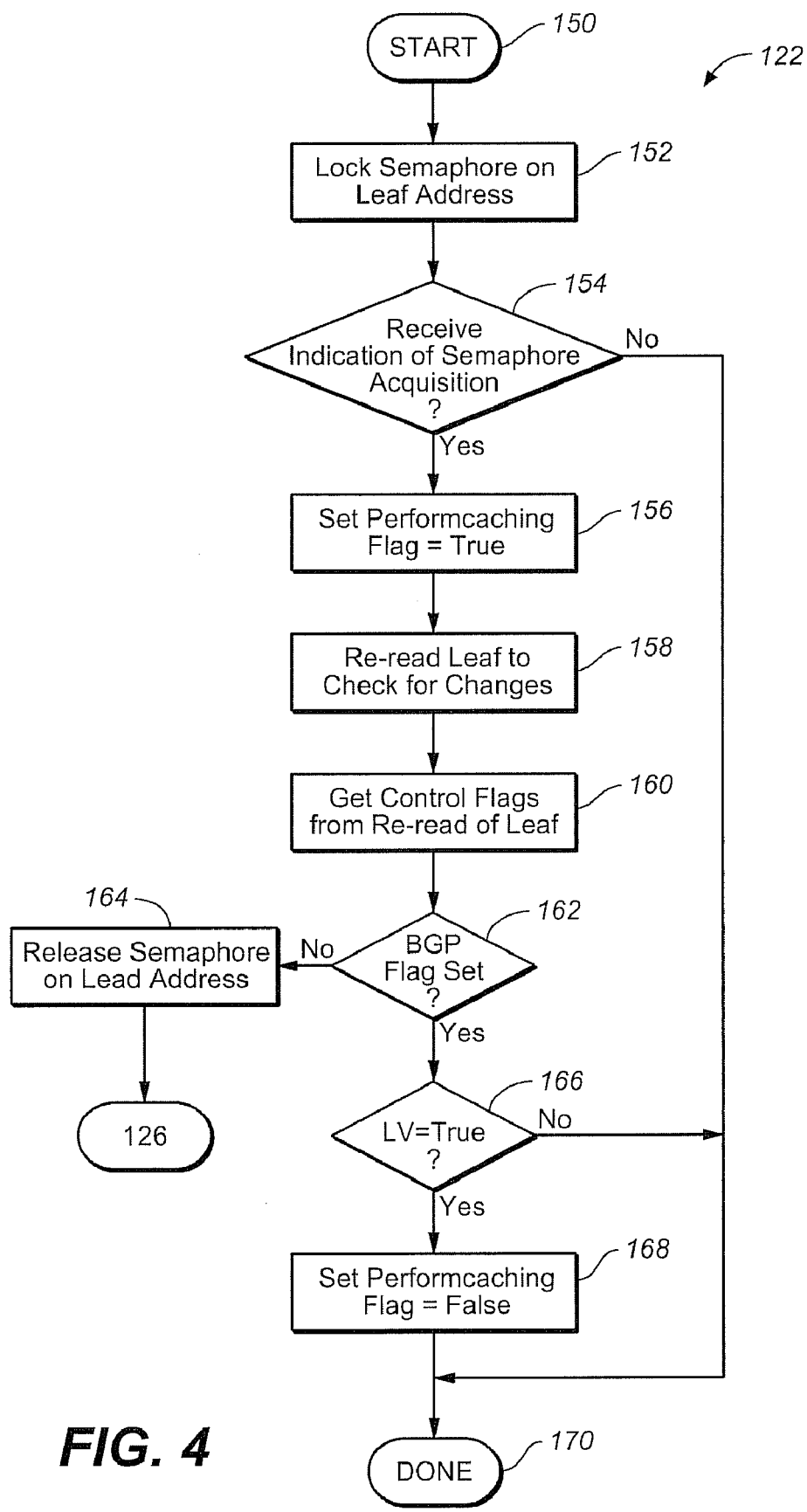
FIG. 4 is a flow diagram illustrating a step of the process of FIG. 3 for enabling the caching of IGP information into a BGP entry.

FIG. 4 is a flow diagram illustrating the step 122 of FIG. 3, in which caching of the IGP information into the BGP entry is enabled. The process begins at 150, and in step 152, the leaf is locked for the current forwarding BGP entry. This allows the BGP entry to be modified without another running process (such as the background maintenance task or other control processes) also trying to modify the entry. A semaphore construct can be used to lock the forwarding leaf. For example, the address of the leaf can be used as the resource value the semaphore lock is made against. Alternatively, other semaphore or locking implementations can be used.

In step 154, the process checks for an indication of semaphore acquisition, e.g., the process waits on the semaphore operation to complete. Once the semaphore is acquired, the process continues to step 156. Step 154 also allows for an optional time-out value to be used, as indicated by the "no" branch from step 154. A time-out mechanism limits the time spent on acquiring a semaphore; if the semaphore is not available in a predetermined specified time limit, then the process flow skips the remaining steps in process 122 and is complete at 170, thus returning to process 100 of FIG. 3 to implement step 124 without caching enabled. Thus, the benefits of a future cached entry are not obtained if this timeout occurs. If no time-out is implemented, then the process can simply wait for the semaphore operation to complete and then fall into step 156, ignoring the "no" result from step 154.

In step 156, after a semaphore on the leaf address has been obtained in step 154, the process sets a PERFORMCACHING flag (stored, for example, in a quickly-accessed register of the network processor) to indicate that the ability to cache the entry is valid. It should be noted that these flags are reset, as default, to non-active, i.e., FALSE states, preferably as part of an initialization function previously performed.

In next step 158, the forwarding leaf is re-read to check for changes to the leaf that may have occurred before the semaphore lock was acquired, e.g. if the leaf were removed, updated, or changed. This step is performed after the semaphore lock has been achieved. In step 160, the control flags are obtained from the re-read of the leaf. The control flags dictate the look-up and caching behavior of the process and include the BGP action flag and the LV (Local Valid) flag, as described above for FIG. 3.

In step 162, the process checks whether the BGP flag is still set to TRUE. This is a confirmation of the flag state as it was known before acquiring semaphore lock. The BGP status of a leaf can change, for example, if there is a network topology change. For example, an internal network may grow to swallow up an end station router. Protocols running in the background detect the change and a process running parallel to the forwarding process updates the leaf by changing it from a BGP leaf to an IGP leaf. If the BGP flag is not true, then the leaf was changed just prior to semaphore lock, and the process continues to step 164 to release the semaphore on the leaf address, and returns back to step 126 of FIG. 3 to continue normal leaf processing. This is similar to step 114 above. If the BPG flag is set, the process continues to step 166, where the process checks whether the LV flag is still TRUE. For the normal case, LV has remained FALSE (as in step 120), and process 122 is complete at 170, so that the next step 124 in the process 100 is initiated. If LV TRUE, (e.g., another control process has changed the LV value before this process locked it) then in step 168, the PERFORMCACHING flag is set back to FALSE, and the process is complete at 170, so that the next step 124 in the process 100 is resumed and completed without caching. The steps 162 and 166 validate the reread values of the leaf and afford exit points for when the leaf has changed prior to the semaphore lock.

Figure 5:
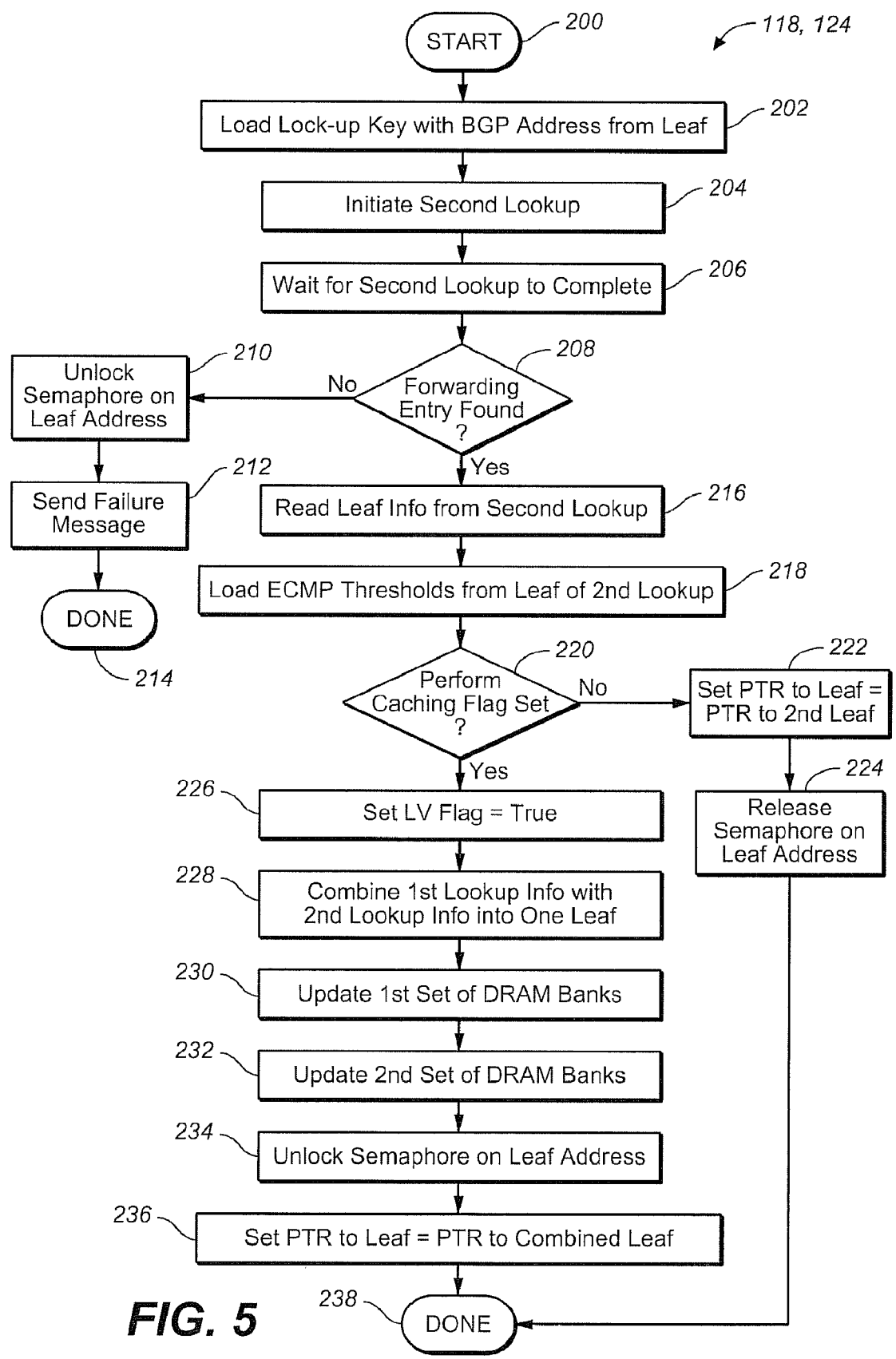
FIG. 5 is a flow diagram illustrating steps of the process of FIG. 3 for providing a second lookup into memory and for caching IGP information in BGP entries.

FIG. 5 is a flow diagram illustrating steps 118 and 124 of FIG. 3, in which a second lookup is performed and, in the case of step 124, caching of the IGP information in the BGP entry is performed. The process begins at 200, and in step 202, the lock-up key is loaded with the BGP address from the leaf, i.e., the BGP address is obtained from the leaf for use as a key in the second lookup (LPM operation).

In step 204, the second lookup is initiated, e.g. a second LPM tree search, and in step 206, the process waits for this second search operation to complete. In step 208, the process checks whether a forwarding entry was found, and is similar to step 106 of FIG. 3 for the first look-up operation. Step 208 provides an error exit for when an IGP entry is not found—in such a case, step 210 is performed, where the semaphore lock is released and in step 212 the process provides a failure message to the controlling software or device, e.g. the code proceeds to a codepoint that can initiate a message creation for notifying the control point processor 12 of the failure. The process would then be complete at 214 (standard failure handling can be implemented). If a IGP forwarding entry is found in step 208, then normal flow would continue to step 216.

In step 216, the entry found from the second lookup is read. This step represents the obtaining of the leaf information associated with the IGP or second lookup entry. This information is read to a different area of memory, and upon completion of this step there are two complete forwarding leaf entries.

In step 218, ECMP (Equal Cost MultiPath) thresholds are loaded from the IGP leaf of the second lookup. This step represents the fetching from the second leaf the ECMP thresholds required by the normal process flow. These thresholds are used to determine which one of three next hop entries in the leaf should be used. For example, if there are multiple paths to get to a destination address (as there often are), each route has a cost associated with it; for example, one route may go through five routers, another route may go through three routers, etc. ECMP thresholds can be used to determine which of the routes to pick, as is well known to those of skill in the art. These thresholds are loaded in this step in the eventuality of an early exit at step 220.

In step 220, a test is made of the PERFORMCACHING flag that may have been set if caching was enabled, i.e. if step 156 was performed. If the PERFORMCACHING flag is not TRUE (i.e., the process flow is such that step 156 of FIG. 4 was avoided, or the flag was reset at step 168 of FIG. 4), then the process continues to step 222, which causes the IGP entry of the second lookup to be used by setting the leaf pointer equal to the second leaf (and no caching via steps 226-236 will be performed). In next step 224, the semaphore lock is released, and the process is complete at 238 so that the process resumes at step 126 of FIG. 3 as a normal two-lookup process.

If the caching flag is set when tested in step 220, caching is allowed, and in step 226, the LV flag is set to TRUE. Setting this flag will allow any subsequent look-ups to the BGP entry (first lookup leaf) to resolve within that single look-up by using the cached IGP information (to be cached in the steps below). By collapsing to a single look-up, the goal of limiting accesses to DRAM to one access is achieved.

In next step 228, the IGP information from the second look-up is combined with the control information of the first look-up to create a single new cached BGP leaf entry. Steps 230 and 232 write back the cached leaf information into DRAM. In step 230, the first set of DRAM banks are updated with the cached leaf information, and in next step 232, the second set of DRAM banks are updated with the cached leaf information. Steps 230 and 232 are preferably structured in such a way that allows for a non-atomic operation for storing the leaf data. This is accomplished by serializing the storage of the new information such that the setting of the LV flag occurs last. For example, in one implementation for the combined leaf (see leaf 30 of FIG. 2), this serialization can be accomplished by first writing DRAM banks C and D in step 230, followed by updating bank B in step 232, where banks B and C hold the cached IGP routing information, bank B holds the LV flag, and bank D holds the BGP routing information (bank A can hold information and/or patterns used by the search process to locate the leaf, not routing information that needs to be written here). Other memory structures/organization can be provided in other embodiments. For an implementation that uses a split-leaf format, as in the example in Tables 2-4 below, this serialization would correlate to writing to banks A/B/C of the DRAM prior to the SRAM portion. Alternatively, for hardware implementations that support atomic operations across multiple banks and/or simultaneous writing operations, this step can be reduced or simplified to a single write.

In step 234, the semaphore associated with the leaf address is unlocked, and in step 236, the leaf pointer is set to the memory location where the combined leaf exists such that a return to the normal process flow can utilize this combined leaf as if it were the one and only leaf.

The process is then complete at 238, so that the process returns to normal process flow at step 126 of FIG. 3.

Figure 6:
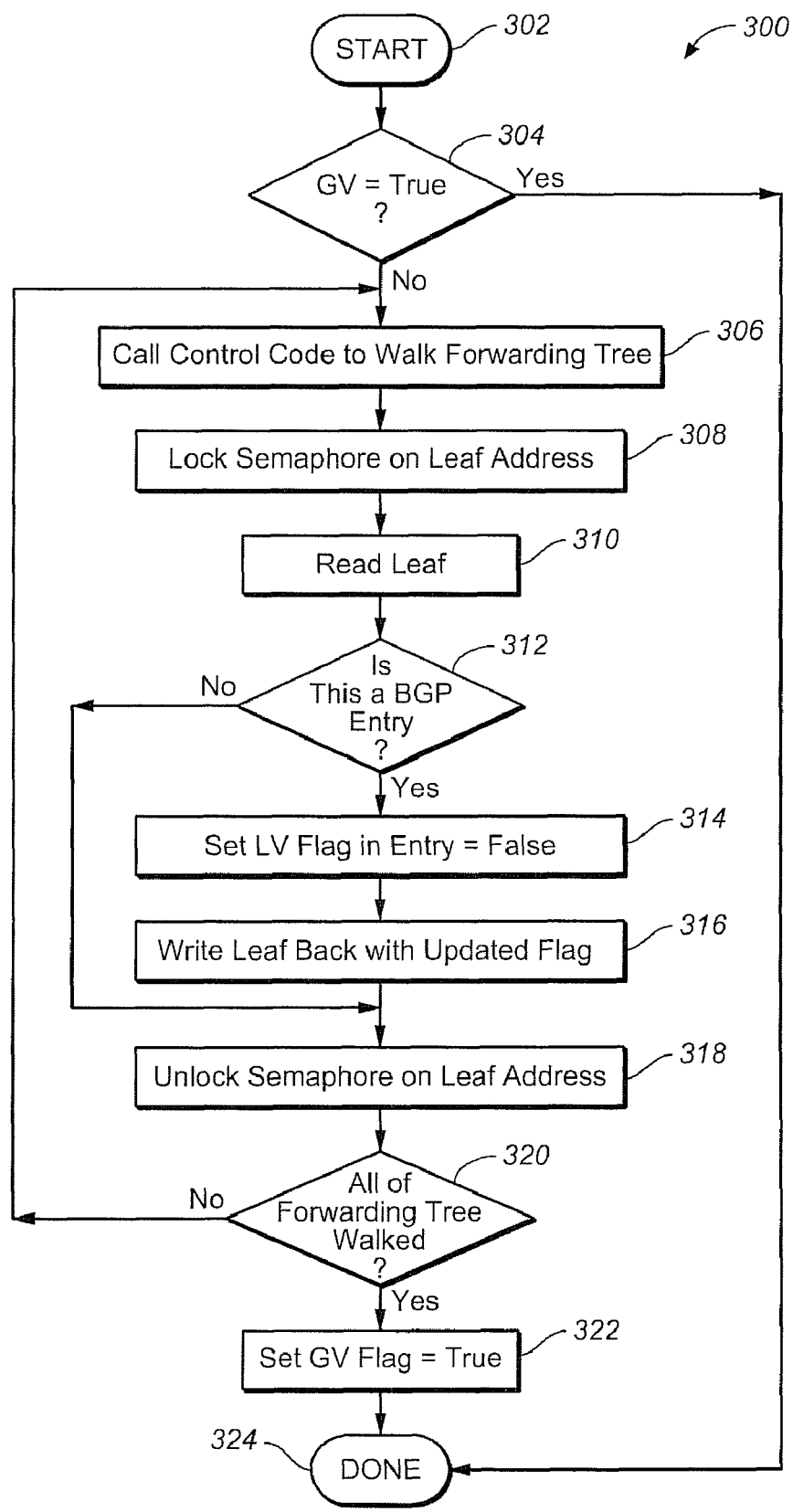
FIG. 6 is a flow diagram illustrating a background maintenance task running in parallel with the forwarding process of FIG. 3 and used for cache coherency.

FIG. 6 is a flow diagram illustrating a process 300 implementing the BackGround Maintenance (BGM) task, which is a standalone component of the method of the present invention used for cache coherency and that preferably runs in the background on its own thread, independent of the forwarding process described above.

It should be noted that the present invention sets the GV flag to FALSE whenever a change or update is made to the IGP entries in the memory tree. This step is not shown in any of the flow diagrams presented herein since it can happen at any time and is not part of the normal process flow for packet forwarding; for example, a parallel-running control process can handle updates. For example, this kind of update can occur when network topologies are changed.

BGM process 300 can be invoked periodically, e.g., every delta time units via timer expiration. The process begins at 302. The routine starts with step 304, a check of the GV flag. If this flag is TRUE, the routine does a quick exit at 324, since there is no work to be done. The GV flag gets reset (to FALSE) whenever an IGP route is added/updated.

If GV is not TRUE, then the process continues to step 306, in which a call is made to control procedures that exist to walk through forwarding trees. These procedures are well known, and have user exits that allow the execution of user functions. The following steps represent just such a function, i.e. steps 308-322 are implemented after a return exit from each step of the walk through the forwarding tree.

In step 308, a semaphore lock is issued on the leaf address that may potentially be changed. This is the same semaphore described in the steps of FIGS. 4 and 5. It is the mechanism that ensures proper sequential access to the common leaf this background task and the forwarding task both want or need to access or change. Once the semaphore lock has been obtained, in step 310 the leaf's contents are read. In step 312, a test is made to see if this leaf contains a BGP entry. If not, the process skips steps 314 and 316, avoiding the change leaf operations, and continues at step 318, described below. If the leaf does contain a BGP entry, the process continues to step 314 and continues with the update portion of the task.

In step 314, the LV flag is set to FALSE (or some alternate form of designating this BGP entry as having an invalid cache is performed). This is the main function of the BGM task. Only after all the LV flags have been reset, will it be possible to set the GV flag to TRUE. Once the leaf has been updated, it is written back to memory in step 316 with the updated LV flag.

In step 318, the semaphore lock is released, allowing the forwarding process access to the leaf. In step 320, a test is made to see if the complete tree has been processed. If not, the process loops back to step 306 and continues the resetting of LV flags. Once all of the forwarding entries (i.e. leaves) of the tree are walked through at the check of step 320 and therefore all the BGP entries have LV flags set to FALSE, step 322 is initiated, which sets the GV flag to TRUE. This action will now allow the forwarding process to reestablish its caching behavior and update any BGP entries with the newly updated IGP information.

The process is then complete at 324. The background maintenance thread exits and awaits expiration of the next timer tick.

Example of Split-Leaf Layout for Forwarding Entry

The layout for a forwarding entry using the split-leaf layout, as contrasted to a DRAM-only implementation, is now described. This layout includes an SRAM portion and a DRAM portion for memory. The SRAM portion of the leaf is partitioned as illustrated in Tables 2-4:

TABLE 2

| Field | Size in bits | Comments |
|---|---|---|
| Start of Hardware/Control Use fields: | | |
| Reserved | 2 | Valid Leaf Flag, Address Translation Flag. Not for use by the forwarding threads. |
| Prefix Length | 6 | Field used by hardware for search purposes. |
| Pattern | 32 | Field used by hardware for search purposes. |
| Start of Software use Fields: | | |
| BGP Action Flag | 1 | Indicates entry is a BGP address |
| Ing_Eq_Egr_Node Flag | 1 | Ingress Equals Egress Node flag |
| LV Flag | 1 | Local Cache Valid flag |
| Reserved | 13 | Reserved bits to make field modulo 2 |
| ECMP thresholds | 16 | Equal Cost Multi-Path Thresholds |
| Total | 72 | Total Width of SRAM portion of leaf |

TABLE 3

| Field | Size (bytes) | Comment |
|---|---|---|
| Next Hop | 4 | IP@ or LSP Token |
| TB/TP | 2 | Target Blade/Target Port |
| Action Flags | 2 | Forwarding Action Flags |
| Egress Context | 2 | Only 12 bits are valid |
| Counter.skip + counter.csi | 3 | Cntr skip flag + Cntr Set Index |
| InsertBottomLabel + bottomLabel | 3 | MPLS insert flag + bottom Label |
| Total | 16 | |

TABLE 4

| Field | Size (bytes) | Comment |
|---|---|---|
| BGP NH | 4 | IP address of BGP Next Hop |
| Next Lookup Table ID | 2 | LPM Tree ID |
| Signature | 1 | Signature Field |
| Reserved | 1 | Unused/spare byte |
| Counter.skip + counter.csi | 3 | Cntr skip flag + Cntr Set Index |
| InsertBottomLabel + bottomLabel | 3 | MPLS insert flag + bottom Label |
| DT part of destination subnet | 2 | Least justified |
| Total | 16 | |

The A/B/C banks of DRAM each represent 1 of the 3 potential next hop structures. The selection of which next hop to choose is made after execution of the ECMP method. The thresholds used as input to the ECMP method are obtained from the last two bytes of the SRAM portion of the forwarding leaf. By putting these thresholds in the SRAM portion of the leaf, the thresholds used as input to the ECMP method are obtained from the last two bytes of the SRAM portion of the forwarding leaf. By putting these thresholds in the SRAM portion of the leaf, the ECMP method can be applied before the DRAM portion of the leaf needs to be accessed. This allows for an improvement in bandwidth allocation to the DRAM memories by accessing fewer banks on a per frame basis.

The D bank of DRAM contains BGP next hop information along with overall leaf management parameters. This information is used as part of the caching method for BGP next hop.

While the present invention is described above with respect to the Border Gateway Protocol (BGP) and IGP, other types of network protocols can be used with the present invention. Other network communications can also be used with the invention, as appropriate, e.g., communications involving multiple lookups of routing information. In addition, alternative memory allocations or configurations can be used to achieve similar results, e.g. more than one memory or memory tree can be used, a different organization of routing data within a leaf can be used, etc.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method executing on hardware for reducing the time to determine data packet routes on a computer network, the method comprising:

performing a single lookup in a memory tree to find a particular first protocol forwarding entry in the memory tree to determine a first protocol route for a packet of data to be routed on the computer network, wherein the first protocol forwarding entry includes first protocol information for a first protocol and a cache of associated second protocol information for a second protocol different from the first protocol;

determining whether the cached second protocol information associated with one or more first protocol entries in the memory tree has been invalidated due to an update to at least one second protocol entry in the memory tree; and retrieving and using the cached second protocol information in the determination of the first protocol route for the packet of data on the computer network.

2. The method of claim 1, wherein the first protocol is an exterior gateway protocol (EGP), and wherein the second protocol is an interior gateway protocol (IGP).

3. The method of claim 1, wherein if the cached second protocol information has been invalidated, the lookup is a first lookup, and further comprising:

performing a second lookup in the memory tree by retrieving and using the first protocol information to find an original second protocol entry in the memory tree; and using the found original second protocol entry in the determination of the destination for the packet of data.

4. The method of claim 3, further comprising:

caching the information in the original second protocol entry found in the second lookup into the first protocol forwarding entry found in the first lookup.

5. The method of claim 1, wherein caches of all first protocol entries in the memory tree are invalidated once the update to at least one second protocol entry in the search tree has been made by storing a global validation indicator.

6. A hardware computer readable storage medium including program instructions that perform a method on a computer device for reducing the time to determine data packet routes on a computer network, the program instructions performing steps comprising:

performing a single lookup in a memory tree to find a particular first protocol forwarding entry in the memory tree to determine a first protocol route for a packet of data to be routed on the computer network, wherein the first protocol forwarding entry includes first protocol information for a first protocol and a cache of associated second protocol information for a second protocol different from the first protocol, wherein both the first protocol information and cached second protocol information are retrievable with the single lookup;

determining whether the cached second protocol information associated with one or more first protocol entries in the memory tree has been invalidated due to an update to at least one second protocol entry in the memory tree; and using the cached second protocol information in the determination of the first protocol route for the packet of data on the computer network.

7. The hardware computer readable storage medium of claim 6, wherein the first protocol is an exterior gateway protocol (EGP), and wherein the second protocol is an interior gateway protocol (IGP).

8. The hardware computer readable storage medium of claim 6, wherein if the cached second protocol information has been invalidated, then further comprising:

(a) performing a second lookup in the memory tree is performed to find an original second protocol entry in the memory tree; and (b) using the information in the original second protocol entry in the determination of the destination for the packet of data.

9. The hardware computer readable storage medium of claim 6, wherein caches of all first protocol entries in the memory tree are invalidated once the update to at least one second protocol entry in the search tree has been made by storing a global validation indicator.

10. An apparatus for reducing the time to determine data packet routes on a computer network, the apparatus comprising:

a mechanism that performs a single lookup in a memory tree to find a particular first protocol forwarding entry in the memory tree to determine a first protocol route for a packet of data to be routed on the computer network, wherein the first protocol forwarding entry includes first protocol information for a first protocol and a cache of associated second protocol information for a second protocol different from the first protocol;

a mechanism that determines whether the cached second protocol information associated with one or more first protocol entries in the memory tree has been invalidated due to an update to at least one second protocol entry in the memory tree; and a mechanism that retrieves and uses the cached second protocol information in the determination of the first protocol route for the packet of data on the computer network.

11. The apparatus of claim 10, wherein the first protocol is an exterior gateway protocol (EGP), and wherein the second protocol is an interior gateway protocol (IGP).

12. The apparatus of claim 10, wherein if the cached second protocol information has been invalidated, the lookup is a first lookup, and further comprising:

a mechanism that performs a second lookup in the memory tree by retrieving and using the first protocol information to find an original second protocol entry in the memory tree; and a mechanism that uses the found original second protocol entry in the determination of the destination for the packet of data.

13. The apparatus of claim 10, wherein the memory tree is implemented in Dynamic Random Access Memory (DRAM).

14. The apparatus of claim 10, wherein a portion of the forwarding entries of the memory tree are stored in Static Random Access Memory (SRAM).

\* \* \* \* \*